D. BENNETT, M. KREBS & J. HALEY.
Glass Mold Carriages.

No. 138,368.           Patented April 29, 1873.

Witnesses.

Inventors.
Daniel Bennett
Michael Krebs
Jonathan Haley
by atty

UNITED STATES PATENT OFFICE.

DANIEL BENNETT, OF BALDWIN TOWNSHIP, ALLEGHENY COUNTY, AND MICHAEL KREBS AND JONATHAN HALEY, ASSIGNORS TO THE CRYSTAL GLASS COMPANY, OF PITTSBURG, PENNSYLVANIA.

IMPROVEMENT IN GLASS-MOLD CARRIAGES.

Specification forming part of Letters Patent No. 138,368, dated April 29, 1873; application filed April 19, 1873.

*To all whom it may concern:*

Be it known that we, DANIEL BENNETT, of Baldwin township, MICHAEL KREBS, of Pittsburg, and JONATHAN HALEY, of Pittsburg, all in Allegheny county, Pennsylvania, have invented certain new and useful Improvements in Portable Carriages for Heating Molds for Glass-Presses, of which the following is a specification:

This invention relates to a portable carriage to be used in the operation of heating molds employed in glass-works.

It is well known that, in order to avoid chilling the glass to be pressed, the molds must be preliminarily heated to a proper temperature to prevent the occurrence of this chilling action. It has hitherto been usual to effect this heating by putting hot glass into the mold, and to continue renewing it until the mold is sufficiently heated. This operation is slow, causes glass to be wasted, is injurious to the mold, and is expensive and objectionable on many other accounts. We propose to remedy the difficulties above named by providing for the molds a portable carriage or frame, adapted to be inserted into and withdrawn from a lear or annealing oven or furnace, or other suitable device, in which the mold can be heated, said carriage or frame being provided with a sliding mold-supporting bed or plate, capable of being moved lengthwise on the said carriage or frame, and arranged in such manner that it, together with the molds upon it, can be pushed back into the heating-chamber in which the molds are to be heated, and, after the heating is effected, be drawn out, and then removed, together with its carriage or supporting-frame, from the heating oven or furnace.

We prefer to mount the carriage or frame on wheels, making it, in some sort, a truck, upon which the molds, after heating, can be transported to the glass-furnace or other spot where they are needed. But, if desired, the carriage may be swung, by means of chains, or suspended from guides, which will allow it to be run into or out of the furnace; or it may be constructed in other ways for this purpose.

We prefer, however, the arrangement which we shall now proceed to describe by reference to the accompanying drawing in illustration of the manner in which our said invention is or may be carried into effect.

Figure 1:
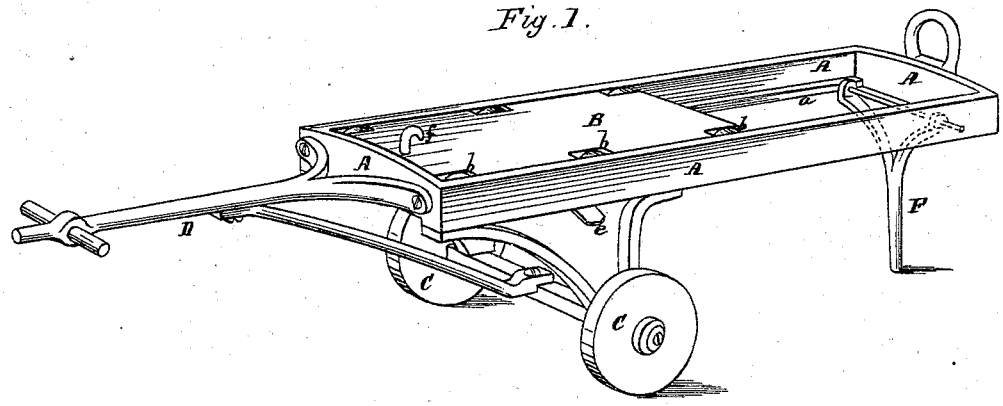
Figure 2:
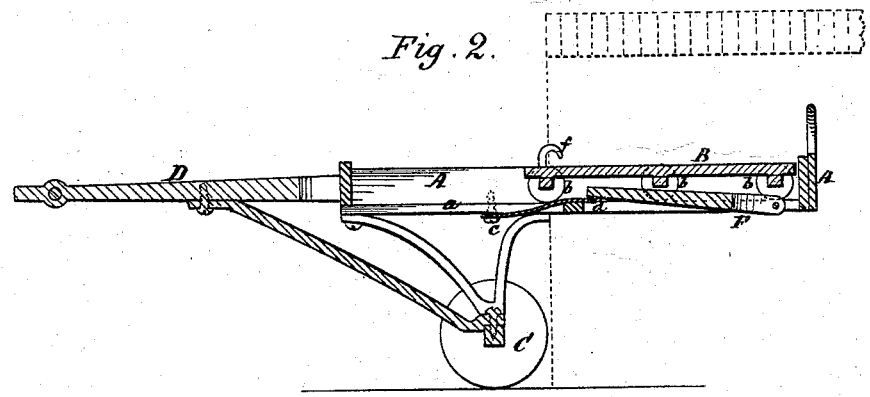
Figure 3:
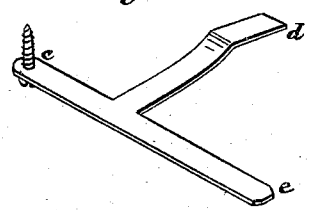

Figure 1 is a perspective view of a portable carriage made in accordance with our invention. Fig. 2 is a longitudinal vertical central section of the same. Fig. 3 is a detail hereinafter referred to.

A is a metallic carriage or frame, which supports and carries a sliding bed or plate, B, upon which the molds are placed. The bed fits between suitable side guides, which, in this instance, are the side pieces of the rectangular frame; and it rests and slides on horizontal ledges or flanges $a$ formed on or attached to the said guides, as shown. To avoid undue friction, and to facilitate the movement of the bed, it is provided, on each side, with a series of rollers, $b$, which run on the ledges or flanges $a$.

This carriage or frame is designed to be run, either wholly or partly, into the oven or chamber in which the molds are to be heated, the sliding bed, on which the molds are placed, being run back on the carriage after the latter is inserted in the oven, so as to get the full benefit of the heat.

We prefer to mount the carriage on a truck-frame or wheels, C, which are arranged and located at or near the front of the carriage, so as to allow the greater portion of the latter to be inserted into the heating-oven; and the carriage is supported on the wheels at such a height above the floor that its bottom will be elevated as high as, or even a little higher, than the hearth or sole of the oven into which the carriage is to be run, so that when the carriage is inserted in the oven, it will be horizontal or thereabout, its front supported by the wheels or truck, and its rear end resting on the hearth or other suitable support in the oven, as indicated in Fig. 2, the dotted lines representing the outline of a portion of the heating-furnace.

The arrangement of the wheels with relation to the carriage and to sliding bed is, preferably, such that the center of the sliding bed, when the latter is moved to the front of the frame, will be nearly or quite over the axles of the wheels, thus balancing the carriage, and rendering it more convenient to draw or move it from place to place. A handle, D, is provided, by which the workmen can draw the carriage.

In order to fully support the carriage in a horizontal position when it is at rest, but not in the oven, we provide a hinged or folded leg or support, F, at the end of the carriage opposite to that where the wheels are located. When the carriage is moving, or is about to be inserted in the heating-oven, this support can be folded up under the carriage, being held in place by a latch or detent of suitable construction. The latch shown in the drawing is represented detached in Fig. 3; it is hinged, at c, to the under side of the frame, as seen in Fig. 2. It has a tongue, d, which fits under the outer end of the upturned leg F, and is provided with a handle, e, by which it may be turned on its pivot or hinge, so as either to withdraw the tongue from under upturned leg—in which event the latter will drop—or to push the tongue under the end of the leg, in order to hold it in place after being upturned.

The carriage, when in use, stands as seen in Fig. 1 while the molds are being placed upon the bed B, the latter being located, at this time, at the front of the truck or frame. As soon as the molds have been placed the leg F is folded up, and the carriage is pushed to the heating-oven, and is run into the same as far as it can go. The sliding bed is then pushed back so as to carry the molds entirely within the oven. After the heating of the molds has been completed the sliding bed is drawn out by means of a suitable rod, with a hooked end to take hold of the hook f on the front of the bed, and the carriage is then withdrawn from the oven, and conveyed to any other locality where the molds are required.

Having described our invention, what we claim, and desire to secure by Letters Patent, is—

1. An apparatus for heating molds for the manufacture of glassware, comprising a portable carriage or frame, adapted and arranged to be run into and out of the heating oven or chamber, in combination with a mold-supporting bed or plate sliding lengthwise in or on said carriage, substantially as herein shown and described.

2. The combination of the carriage or frame, its supporting wheels or truck, and the sliding mold-supporting bed, under the arrangement and for operation as shown and set forth.

3. An apparatus for heating molds, consisting of the parts herein described—namely, the carriage or frame and draft-pole or handle, the sliding mold-supporting bed or plate, the truck or wheels, and the hinged leg or support and its latch, said parts being arranged together for joint operation, substantially as shown and set forth.

In testimony whereof we have hereunto signed our names in the presence of two subscribing witnesses.

DANIEL BENNETT.
MICHAEL KREBS.
JONATHAN HALEY.

Witnesses:
DAVID BARKER,
WESLEY BENNETT.